United States Patent [19]

Kurtin et al.

[11] 4,151,998
[45] May 1, 1979

[54] PHONOGRAPH TONE ARM AND CARTRIDGE DAMPING SYSTEM

[75] Inventors: Stephen Kurtin, Sherman Oaks, Calif.; Bruce R. Maier, Columbia, Mo.

[73] Assignee: Discwasher Corporation, Columbia, Mo.

[21] Appl. No.: 917,864

[22] Filed: Jun. 22, 1978

Related U.S. Application Data

[63] Continuation of Ser. No. 766,806, Feb. 8, 1977, abandoned.

[51] Int. Cl.² .............................................. G11B 3/18
[52] U.S. Cl. .................................................. 274/23 R
[58] Field of Search ............................. 274/23 R, 24

[56] References Cited

U.S. PATENT DOCUMENTS

| | | | |
|---|---|---|---|
| 2,566,091 | 8/1951 | Masterson | 274/24 R X |
| 2,572,712 | 10/1951 | Fisher | 274/23 R |
| 3,228,700 | 1/1966 | Andrews et al. | 274/23 R |
| 3,301,565 | 1/1967 | Bachman | 274/23 R |

OTHER PUBLICATIONS

"A New Method of Arm Cartridge Damping," Rangabe, Collected Papers, 2nd Ed., 1975 Convention of Audio Engineering Society.

Primary Examiner—Charles E. Phillips
Attorney, Agent, or Firm—Jack C. Berenzweig

[57] ABSTRACT

A phonograph tone arm and cartridge damping system in which a damper is coupled to a tone arm having a cartridge at one end thereof or to the cartridge itself and is adapted to ride on the surface of a record to minimize the effect of surface warps on the tone arm and cartridge. The damper includes a housing, a low friction piston slidable within the housing, and a glider adapted to ride on the surface of the record. The piston has an orifice therethrough to permit ambient air forced through the orifice to serve as the damping medium, or the piston and the housing have a preselected spacing between them to allow ambient air to flow therethrough. The glider has attached thereto a piece of soft velure or pile fabric, or a plurality of brush tips, which act to minimize friction between the glider surface and the record.

23 Claims, 9 Drawing Figures

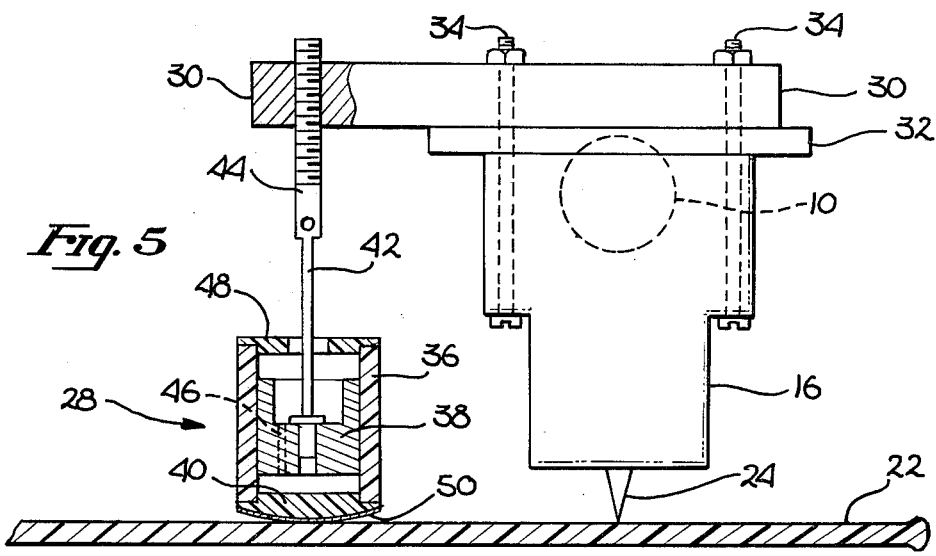
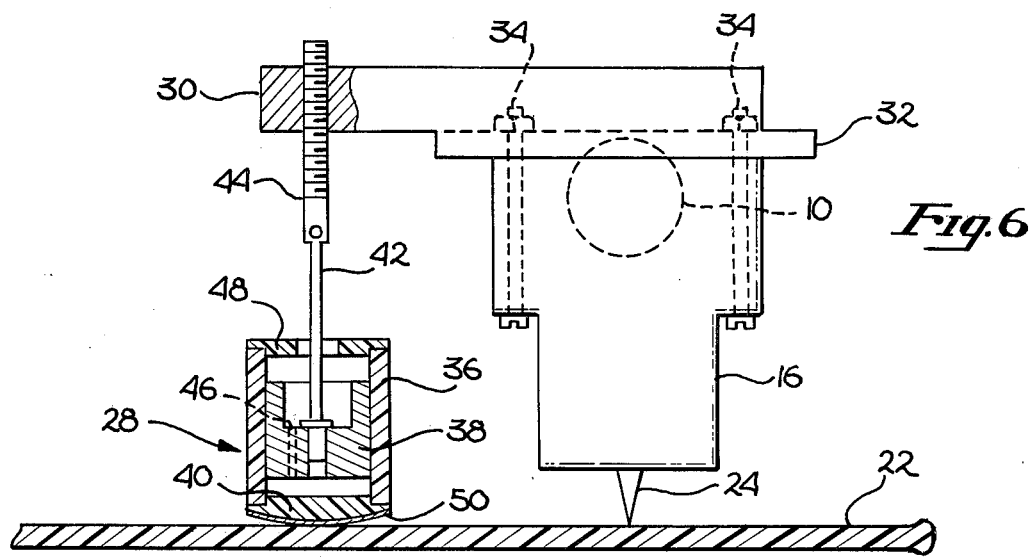
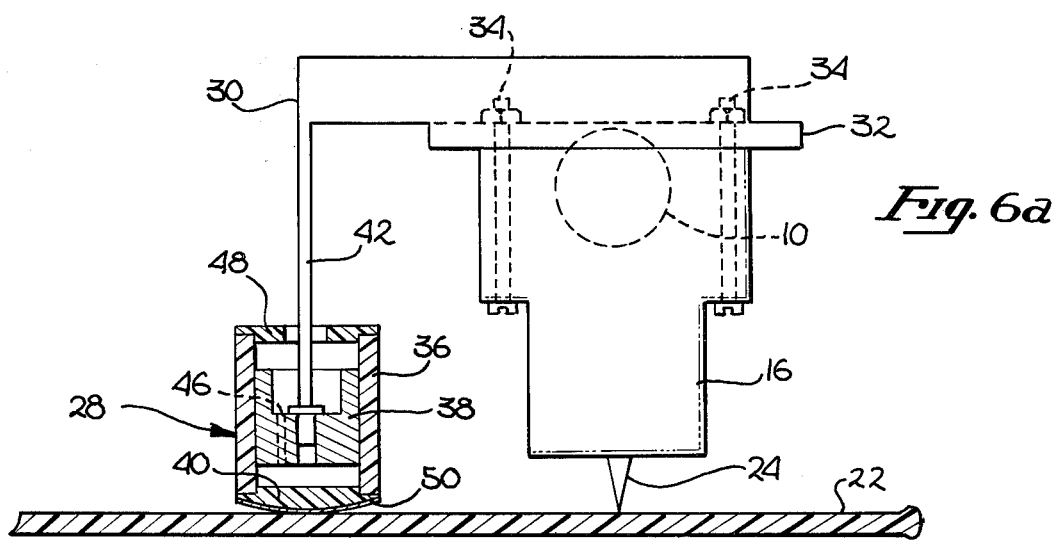

PHONOGRAPH TONE ARM AND CARTRIDGE DAMPING SYSTEM

This is a continuation of application Ser. No. 766,806, filed Feb. 8, 1977 now abandoned.

BACKGROUND OF THE INVENTION

1. Field of the Invention

The invention relates in general to the field of sound reproduction and, in particular, to damping systems for tone arms and cartridges used in the reproduction of sound recorded on phonograph records.

2. Prior Art

It is essential in the faithful reproduction of sound recorded on a phonograph record that the stylus be kept in proper contact with the grooves of the record so that it can follow the signal modulations in such grooves. Some of the audible indications that the tone arm is deficient in permitting the stylus to follow such modulations are: breakup and/or sibilance during massed string, brass or choral passages; lack of definition during loud or impulsive passages; a wandering or unstable stereo image; improved sound quality when a cartridge is tracked at or above the high end of its manufacturer-recommended tracking force range; and distortion (as a consequence of extreme woofer movement, intermodulation, or transient amplifier overload) resulting from large subaudible signals being fed into the input of the amplification/reproduction chain.

These audible deficiencies usually result from an uncontrolled resonance in the tone arm-cartridge-record system. The resonance for typical tone arm-cartridge combinations occurs in the range from 5–14 Hz. Unfortunately, virtually all commercial records are somewhat warped, having the highest relative warp occurrence, significant warp velocity and the large warp amplitude in the 5–14 Hz region. Since tone arm cartridge resonance occurs in the same frequency region as do most record warps, these warps thus excite this resonance with the result that the motion of the tone arm/cartridge combination can be many times larger than the motion of the stylus and the hence electrical output from the cartridge will be many times larger than that representative of the motion of the stylus in response to intentional signal modulations. Furthermore, since the tracking force (as measured between the tip of the stylus and the surface of a record) is the only force available to (a) accelerate the mass of the stylus tip relative to the cartridge, (b) drive the tone arm and (c) allow the tone arm cartridge system to respond to warps, to the extent the tracking force is used up in responding to a warp, insufficient tracking force will be available to accelerate the stylus, i.e., to enable the stylus to perform its primary function of tracking the signal modulation.

Merely increasing the tracking force to overcome the above problems results in excessive wear and can even collapse of the fragile stylus cantilever of many of today's better cartridges. Numerous techniques have, consequently, been suggested to damp the tone arm resonance and suppress the resonant peak in the response-frequency curve. Since the peak of the tone arm resonance can be reduced by increasing the resistance associated with the tone arm-cartridge system from its typical nominal value of approximately 250 dyne sec/cm to 1850 dyne sec/cm, and thus reducing the Q of the system from approximately 3.5 to 0.5, numerous techniques have been suggested to increase such resistance and lower the Q of the system.

One of such techniques has been to increase resistance associated with the stylus compliance. Since, however, such an increase would cause the cartridge body to move in synchronism with the stylus at high stylus velocity, and since an electrical output occurs only when the stylus moves relative to the cartridge body, there would be little or no output for heavily modulated musical passages, that is, signal output would roll-off with increasing stylus velocity, hence this technique is not viable.

Another approach to increase the resistance has been to damp the pivot around which the tone arm rotates, and thereby increase the resistance of the system. While this approach acts effectively to reduce the peak of resonance, all of the motion of the tone arm must be induced as a result of stylus motion with the result that the system now exhibits enhanced sensitivity to warp frequency below resonance. A recently proposed third approach to increase the resistance involves attaching to the tone arm a damper the bottom of which rides on the record surface. This damper should have a resistance of approximately 1850 dyne sec/cm and be partially supported by the tone arm and partially by the record surface. This approach has been described in an article entitled "A New Method of Arm/Cartridge Damping" by A. R. Rangabe, published in the collected Papers, 2nd. Edition, of the 1975 Convention of the Audio Engineering Society. The damper described by Rangabe consists of a support plate attached to the tone arm at the cartridge and a spigot attached to this plate and extending into a cup which is partially filled with a high viscosity silicone fluid and rests on the record surface. A compliant rubber diaphragm is bonded to the cup and the spigot, and a guide bearing is provided at the upper end of the cup to keep the cup and the spigot in alignment. An alternative embodiment using a solid visco-elastic damping material in place of the silicone fluid is suggested but not described.

While the prior art damper provides an approximation to the necessary damping action, and thereby reduces the Q of the tone arm resonance without requiring stylus motion, there are many advantages inherent in the present invention over the prior art damper. In increasing the system resistance to reduce the Q of the resonance, it is desirable to provide a damper which adds only a velocity dependent resistive loss to the system and which specifically does not appreciably add parasitic mechanical factors such as friction or springiness, because, if and to the extent present, extraneous mechanical factors complicate the mechanical response of the system, detract from the intended function of the damper and are detrimental to the performance of the system. The present invention however, does not introduce significant parasitic factors including the friction of the guide bearing, the stiffness of the diaphragm, the springiness of the air trapped between the silicone fluid and the diaphragm, and the friction at the cup-record interface due to a teflon (PTFE) coating since teflon does not exhibit its low-friction properties at the extremely low bearing forces appropriate to tracking a high fidelity record. Substitution of a visco-elastic damping material, while possibly eliminating the need for a guide bearing and its friction, merely substitutes the springiness inherent in all visco-elastic solids for the stiffness of a diaphragm and the springiness of trapped air.

Accordingly it is a general object of the present invention to provide an improved tone arm and damping system.

It is another object of the present invention to provide an improved damper for a tone arm-cartridge system which does not add appreciable springiness to the system.

It is a further object of the present invention to provide an improved damper for a tone arm-cartridge system which does not add appreciable frictional losses to the system.

It is yet another object of the present invention to provide an improved damper for a tone arm-cartridge system which has low mass and is not susceptible to fluid leakage.

SUMMARY OF THE INVENTION

A phonograph tone arm and cartridge damping system is provided which acts to minimize the effect of record warps on the electrical output of the cartridge. The system comprises a damper coupled to the tone arm, or to the cartridge affixed to the tone arm, and adapted to ride on the surface of the record. The damper includes a housing, a piston slidable within the housing, and a glider adapted to ride on the surface of the record. The piston has an orifice therethrough to permit ambient air forced through the orifice to serve as the damping medium, or the piston and the housing have a preselected spacing between them to allow ambient air to flow therethrough. The glider has attached thereto a piece of soft velure or pile fabric or a plurality of brush tips which act to minimize friction between the glider surface and the record.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 5 is a cross-sectional view of a preferred embodiment of the present invention.

FIGS. 6 through 9 are cross-sectional views of further embodiments of the present invention.

DETAILED DESCRIPTION OF THE INVENTION

Figure 1:
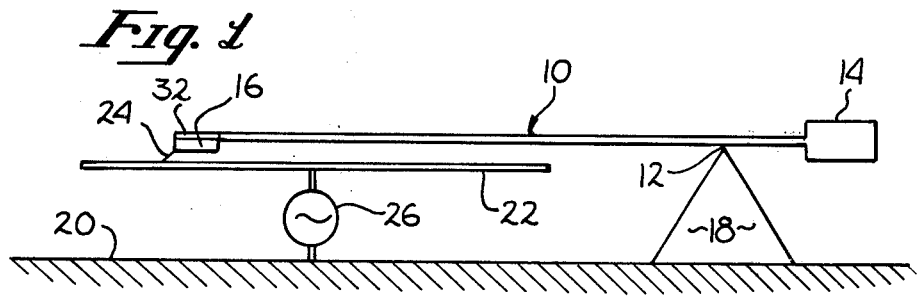
FIG. 1 is a diagrammatic representation of a tone arm cartridge record system.

In FIG. 1, a diagrammatic representation of the tone arm cartridge record system is illustrated. The tone arm cartridge system consists of a tone arm 10, which includes a headshell 32, pivoted at pivot point 12 and having a counterweight 14 at one end of the arm 10 and a cartridge 16 at the other end. The tone arm pivot 18 is rigidly affixed to a reference ground plane 20. An ideal record 22 is contacted by a stylus 24 which is coupled via its cantilever (not shown) to the cartridge 16 and is coupled to the ground plane 20 by an oscillator 26 which presents to the stylus 24 through the ideal record 22 a time variant force equivalant to the undesired modulations which correspond to the warps that are always present in an actual record.

The tracking force measured between the tip of the stylus 24 and the surface of the record 22 is obtained by adjusting the counterweight 14 to achieve a static balance and then by offsetting the counterweight 14 to obtain the desired net tracking force. The optimum tracking force is the minimum force which, for a warp free record, would allow the stylus 24 to track all of the signal modulations. Since only this one net force is available to meet the total dynamic mechanical requirements of the tone arm-cartridge-record system, i.e., accelerate the mass of the stylus tip as it traces the modulated, signal-bearing record groove in the transduction process drive the tone arm as it follows the record groove, and allow the tone arm-cartridge system to respond to warps, it is clearly seen that to the extent that a portion of the tracking force is used to drive the tone arm and/or track warps, the remainder available to accellerate the stylus tip mass is diminished.

Figure 2:
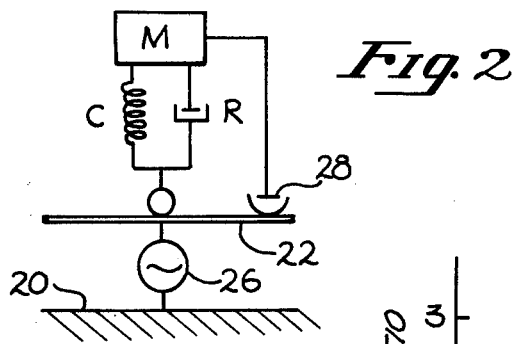
FIG. 2 is a dynamical model of a tone arm-cartridge-record system using the damper of the present invention.

In FIG. 2 a dynamical model of the tone arm cartridge record system is illustrated to enable a better understanding of the present invention. The effective mass M of the tone arm 10 and the cartridge 16 is shown coupled to the ideal record 22 through the compliance C of the stylus cantilever, the resistance R associated with the stylus cantilever compliance and the mass m of the stylus 24 itself. The effective mass M can be determined by applying a force to the stylus tip, measuring the resultant acceleration of the tone arm cartridge combination and calculating the effective mass by applying Newton's Second Law. The effective mass M is, therefore, a quantity which characterizes the response of the tone arm-cartridge combination to an acceleration applied at the tip of the stylus 24. Typical values of effective mass for modern tone arm-cartridge combinations range from 13 to 28 grams. Of this amount, the cartridge itself usually contributes 4 to 12 grams. The cantilever compliance C is a quantity which characterizes the force a spring exerts when compressed from its equilibrium position by a specific distance. In modern cartridges, the stylus is compliantly mounted to the cartridge by an elastomeric block, or toroid, which restrains the cantilever to which the stylus is mounted. Typically, this compliance is, for high quality cartridges, 15 to 30 × $10^{-6}$ cm/dyne. The elastomeric mounting of a modern, high quality stylus cantilever has, in parallel with its compliance C, a resistance R of approximately 250 dyne sec/cm.

At very low frequencies, the motion of the tone arm-cartridge system is stiffness controlled, that is the motion of the stylus is sufficiently slow that the effective mass M has enough time to respond to the details of the motion of the stylus. The effective mass M, therefore, follows the motion of the stylus almost perfectly and there is little or no electrical output from the cartridge since there is little or no relative motion between the stylus and the cartridge body. As the frequence applied to the stylus is increased, the inertia of the effective mass M begins to become more and more significant relative to the springiness of the compliance and resonance sets in; that is, energy applied is effectively and alternately interchanged between the motion of the mass M and the compression of the compliance. At resonance the motion of the effective mass can be many times larger than the motion of the stylus and, correspondingly, at and near resonance the electrical output from the cartridge will be many times larger than that representative of the stylus' motion. As the frequency is increased yet further, the inertia of the effective mass becomes of overwhelming significance relative to the weak and rapidly varying force being applied to it by the stylus-driven compliance. Consequently, the effective mass remains virtually motionless while the stylus vibrates under it. This situation is called mass controlled and is ideal for high fidelity transduction since the electrical output of the cartridge, which corresponds to the relative motion of the cartridge body and the stylus, now represents solely the motion of the stylus. Because the stylus compliance C has a resistance R in parallel with it, there will be some velocity-dependent force transmitted through that resistance to the effective mass. The resistance must thus be chosen so that at the highest stylus velocities of interest the force transmitted through this resistance is negligibly small or else the effective mass would begin to move in synchonism with the stylus causing a roll-off in the electrical output of the cartridge at high stylus velocity. For most modern cartridges this resistance, as stated above, is approximately is 250 dyne sec/cm and the Q (or "Quality") or quality of the system, which is a measure of its of resistive loss, is in the range from 3 to 4.

Figure 3:
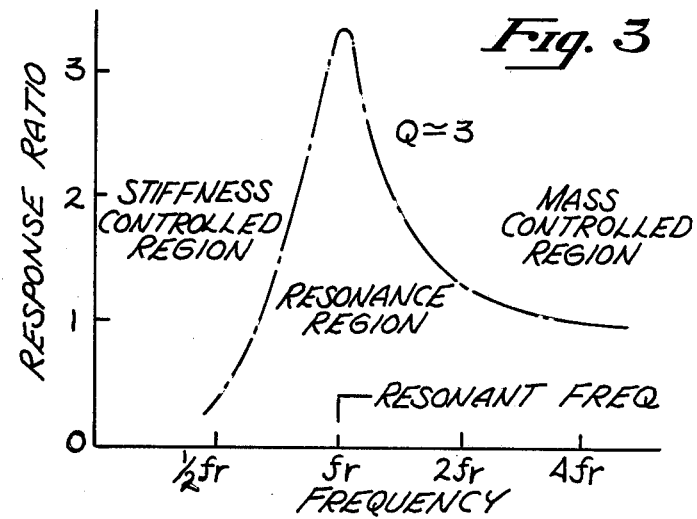
FIG. 3 is a graph illustrating response ratio versus frequency for tone arm resonance.

In FIG. 3 a graph showing the response ratio versus frequency for tone arm resonance is illustrated for a Q approximately 3. The numerical value of the resonant frequency depends on the effective mass and compliance of the tone arm-cartridge system and typically lies between 5 and 14 Hz.

Since, as stated above, the probability of warp occurrence and warp amplitude increase rapidly with decreasing frequency, starting at approximately 20 Hz, while warp velocity rises with decreasing frequency and peaks broadly in the 2–6 Hz region, it is apparent that the response of the tone arm-cartridge system to such warp occurance, amplitude and velocity can be very large since the resonant frequency of the tone arm-cartridge system typically lies directly in the warp frequency region. It is, therefore, desirable to reduce the response ratio in the vicinity of the resonant frequency so that the motion of the effective mass and consequently the electrical output from the cartridge will be relatively small at such frequency.

Figure 4:
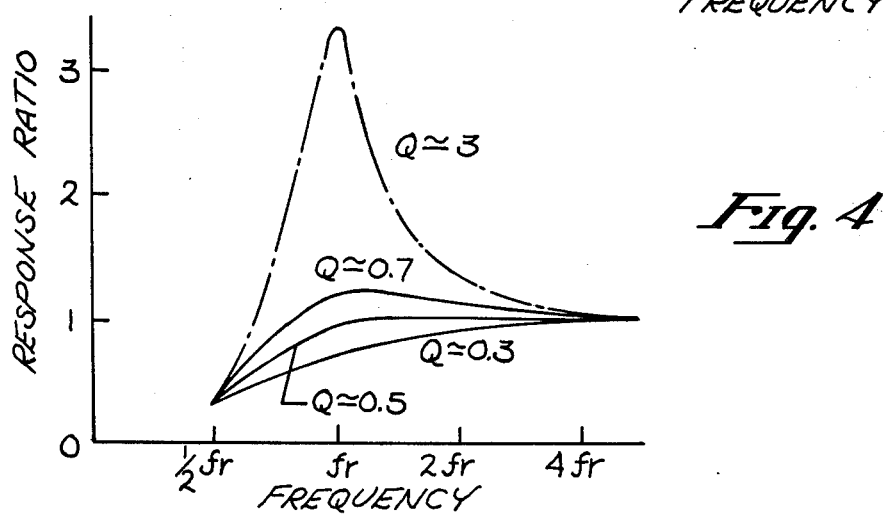
FIG. 4 is a graph illustrating the effect of tone arm damping on tone arm resonance.

As is illustrated in FIG. 4, the response ratio at the resonant frequency can be greatly decreased by decreasing the Q of the system. Since the higher the resistive loss in the system, the lower the Q of the system, it is clear that marked improvement in the performance of the typical tone arm-cartridge combination can be achieved by the proper addition of more resistance to the system, and it can be shown that for typical tone arm/cartridge combinations, a Q of 0.5 requires the addition of resistance of approximately 1850 dyne sec/cm to the system.

This resistance can be most effectively introduced into the system, as stated previously, through the use of a damper 28 attached to the tone arm 10, generally via the head shell 32, and supported partially by the tone arm 10 and partially by the record 22 and which rides on the surface of the record 22. The damper 28, as shown in FIG. 2, is located between the oscillator 26 and the tone arm-cartridge effective mass M and therefore damps the effects of warps without requiring motion of the stylus 24. The graph of response ratio versus frequency which corresponds to such damping is that of a damped tone arm-cartridge system with a Q of 0.5 as shown in FIG. 4.

In FIG. 5, a preferred embodiment of the present invention is illustrated. The record 22 is contacted by the stylus 24 coupled to the cartridge 16 and the tone arm 10. A mounting bracket 30 is coupled to the head shell 32 of the tone arm 10 by a pair of screws 34 which also serve to couple the cartridge 16 to the headshell 32. The headshell 32 may be formed integral with the tone arm 10 but is in general detachable therefrom, and any reference to the damper 28 being coupled, whether integral or detachable, to the tone arm 10 shall also include the alternative construction of such a coupling being to the headshell 32, and vice-versa. The bracket 30 provides both the means for securing the damper 28 to the headshell 32 and the tone arm 10 and a range of vertical adjustment. The damper 28 consists of a housing 36, a piston 38, an end cap 40 which serves as a glide surface and a rod 42 coupled to the piston 38 at one end and to the mounting bracket 30 at the other end. The end cap 40 has a preselected radius of curvature such that there will be no undue pressure on the surface of the record 22 while allowing for small variations in angular alignment of the damper 28 and rod 42. The damper 28 is preferably located just alongside the stylus 24, to assure that it is subject to the same displacements which would otherwise be transmitted solely through the stylus 24, although other locations of the damper 28, such as in front of tone arm 10 (or headshell 32) or to the rear of the cartridge assembly 16, would still yield a significant improvement over prior art devices. The rod 42 has a threaded portion 44 which can be screwed into a corresponding threaded aperature in the bracket 30 to adjust the vertical offset of the piston 38 relative to the head shell 32, such that the piston 38 is at its neutral position when the stylus 24 is resting in the groove of a the record 22 when motionless. Since air is used as the damping medium, an orifice 46 is provided through the piston 38 so as to allow air to flow from the region above the piston 38 to the region between the piston 38 and the rod 42 and the end cap 40. A retaining ring 48 is provided to limit the ultimate travel of the piston 38 so that the tone arm 10 can be lifted from the record 22 without the piston 38 coming out of the housing 36. The housing 36 may consist of a glass or pyrex cylinder having an outer diameter of 0.3 inches and an inner diameter of 0.2 inches. The piston 38 may be composed of graphite and configured such that the spacing between the piston 38 and the housing 36 is approximately $10^{-5}$ inches, thereby providing a low friction essentially airtight sliding fit between the inner surface of the housing 36 and the outer surface of the piston 38. The rod 42 may be composed of aluminum and the retaining ring 48 and end cap 40 may be composed of nylon. The size of the orifice 46 is preadjusted such that the resistance of the damper 28 as the piston 38 travels up and down within the housing 36 is approximately 1850 dyne sec/cm and is of the order of $5 \times 10^{-3}$ inches in diameter for a piston having a 0.2 inch diameter. Since the housing 36 and the piston 38 form an essentially airtight fit, the air forced through the orifice 46 by the motion of the housing 36 and the piston 38 results in an almost pure viscous, i.e., resistive, loss to the system for the amplitude and velocity parameters experienced by the damper 28, rather than introducing a springiness into the system due to the compression thereof. In operation, the bottom edge of the piston 38 is adjusted by means of the threaded portion 44 to be approximately $20 \times 10^{-3}$ inches above the top surface of the end cap 40 and the stroke of the piston is approximately $10 \times 10^{-3}$ inches.

Since the glide surface of the end cap 40 should have as low a frictional engagement with the surface of the record 22 as possible, it has generally been considered to provide a protective lubricant on such surface, such as the layer of teflon used in the prior art. It has been found, however, that while teflon is a good lubricant between surfaces having contact pressures greater than 1000 grams per cm$^2$, it is a poor lubricant in the present situation where the pressure is on the order of only 1 gram per cm$^2$. A lubricant found satisfactory for the present application, and which produces a coefficient of sliding friction less than 0.1, is provided by EM Lubricants under the tradename of "Microseal 200-1."

Since, however, the rigid contact surface of the end cap 40 makes an offensive, scratching or scraping noise when in contact with the record 22 and is sensitive to chemical contamination by finger compounds containing lubricant-destroying lipids and acids, an engagement means 50 is provided between the surface of the end cap 40 and the surface of the record 22 which may comprise a piece of soft velure or pile fabric 50 attached to the bottom of the end cap 40 generally, soft velure fabrics and pile fabrics each comprise brush tips or whisker like projections formed from either loops or tufts of material which extend outwardly from the fabric surface. In order for the brush tips or whisker like projections of the fabric which forms the engagement means 50 to contact and ride on the bottom of the encoded grooves of the record 22, the brush tips or whisker like projections thereof should preferably have a diameter smaller than the smallest potential groove diameter (0.0007 inches) and a length capable of touching the bottom of the deepest groove on the record 22 (approximately 0.003 inches). Such an engagement means 50 provides a minute groove tracking system which assists the stylus 24 in driving the tone arm 10 as it follows the recording groove, and generally eliminates objectionable scraping, scratching or contact noises which might otherwise originate from contact of the end cap 40.

Figure 7:
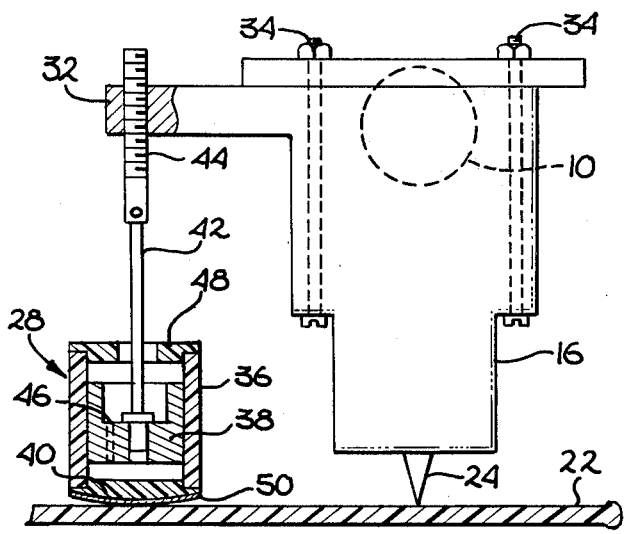
Figure 7A:
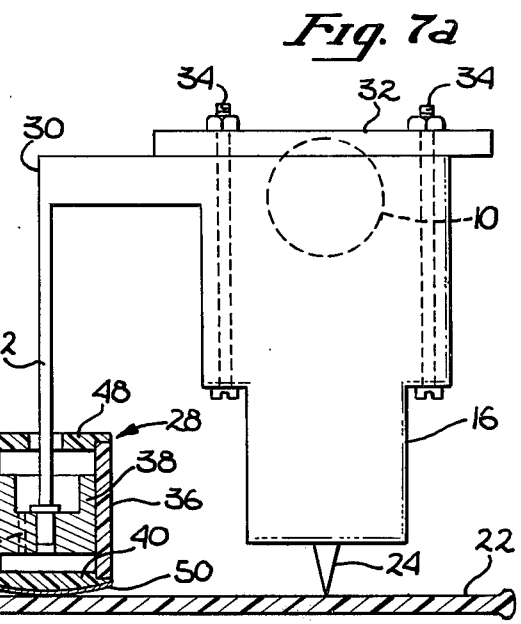

In FIGS. 6 through 9 further embodiments of the invention are illustrated. In FIG. 6 the mounting bracket 30 is formed integral with the headshell 32 (or tone arm 10) so as to provide increased rigidity between the bracket 30 and the tone arm 10 and eliminate any misalignments which may occur during the installation of the bracket 30 by the user or during the operation and use of the system. If it is not necessary to adjust the height of the piston 38, as where the cartridge is permanently connected to the headshell or the tone arm, the piston 38 may be integrally connected to the bracket 30, and hence to the headshell 32 (or the tone arm 10), via rod 42, as is shown in FIG. 6A. Thus a substantial portion of the damping system may be manufactured as an integral part of the headshell 32 or the tone arm 10. In FIG. 7, the mounting bracket 30 and the rod 42 are formed integral with the cartridge 16 so that the present invention may be conveniently installed in existing systems by merely replacing the cartridge 16, while retaining the advantages of rigidity and elimination of misalignment as described above. Since in such instances it will generally be unnecessary to adjust the height of the piston 38, the piston 38 may be integrally connected to the bracket 30, and hence to the cartridge 16, via rod 42, as shown in FIG. 7A.

Figure 8:
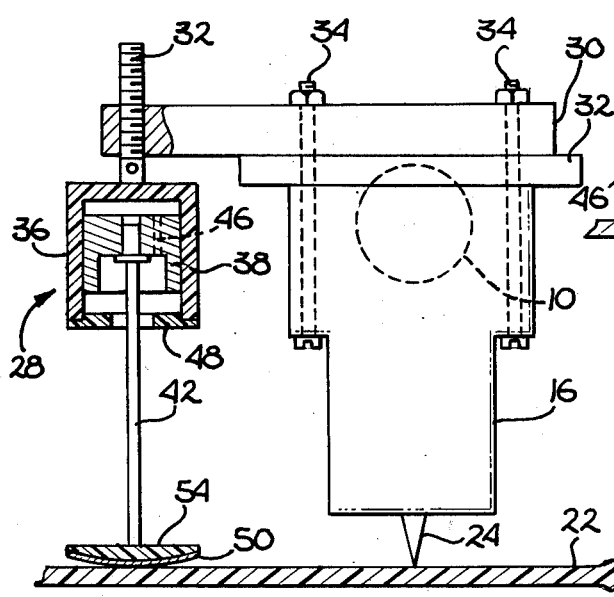

As is illustrated in FIG. 8, the damper 28 may be employed in an inverted position in which the housing 36 is coupled to the bracket 30 by a screw 52 bonded to the housing 36 and screwed into a corresponding threaded aperature in bracket 30 to adjust the vertical offset of the housing 36 relative to the head shell 32. A glider 54, similar to the end cap 40 of FIG. 5, is placed on the end of rod 42 to enable the damper 38 to ride on the surface of the record 22 and to introduce the desired resistance to the system, as previously described. The glider 54 is shown having the engagement means 50 thereon to assist the stylus 24 in driving the tone arm 10 and generally eliminate objectionable scraping, scratching or contact noises.

Figure 9:
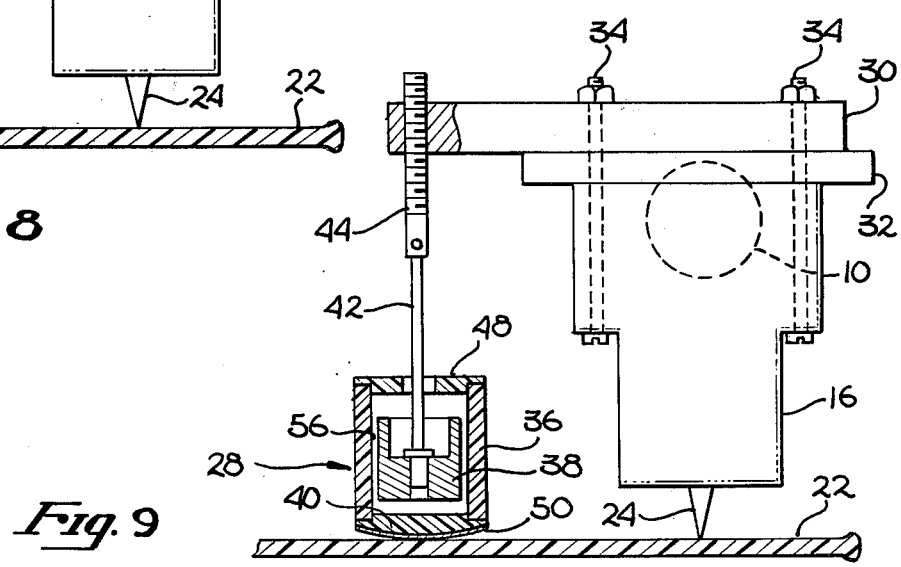

In FIG. 9, a further embodiment of the present invention as illustrated in which the piston 38 and the housing 36 have a preselected spacing 56 between them to allow ambient air to flow therethrough, instead of through the aperature 46 as described in conjunction with FIG. 5, to provide added resistive loss to the system. Such spacing would be of the order of $5 \times 10^{-5}$ to $5 \times 10^{-3}$ inches for a piston having a 0.2 inch diameter, as is evident, the embodiments described above may alternately have the bracket 30 and the housing 36 integrally coupled to the headshell 32 or the tone arm 10 or the cartridge 16 in the manner shown in the various configurations of FIGS. 6, 6A, 7 and 7A.

The weight of the damper 28 manufactured in accordance with the preferred embodiment described above would be approximately 1 gram. When the damper 28 is not in contact with the record 22, all of its mass acts on the tone arm 10. When the damper 28 is in use the portion thereof gliding along the record 22 is supported by the record 22 and consequently only the portion of its total mass directly affixed to the bracket 30 and the head shell 32 acts on the tone arm 20. Therefore, to set the tracking force with the damper 28 installed, the tone arm 10 is balanced in the usual manner and thereafter the desired tracking force is applied plus the appropriate fraction of the mass of the damper 28. For example, it might be appropriate to set the tracking force adjustment to an indicated 1.83 grams to track at 1.0 gram applied to the stylus 24; the extra 0.83 gram is required to compensate for the weight of that portion of the damper 28 supported by the record surface by unavoidably included when balancing the tone arm 10.

As is evident, the present invention overcomes the numerous disadvantages of the prior art device. Because of the close spacing of the housing 36 and the piston 38 a low friction sliding fit is provided which eliminates the frictional forces generated by the guide bearing of the previous device. In addition, since air is used as the damping medium being forced through the orifice 46 by the motion of the housing 36 and the piston 38 or flowing between the housing 36 and the piston 38 to result in an almost pure viscous loss to the system, the present invention eliminates the use of a silicone fluid, the friction of the diaphragm due to its stiffness, the springiness of the diaphragm and the trapped air, and any springiness which would have necessarily occurred if the visco-elastic solid had been substituted for the silicone fluid. Finally, friction at the glider surface has been minimized, contact noise substantially eliminated and increased tracking provided by the use of a fiber or cloth or brush engagement means at the bottom of the damper.

Having thus described the invention, it is obvious that numerous modifications and departures may be made by those skilled in the art; thus, the invention is to be construed as being limited only by the spirit and scope of the appended claims.

We claim:

1. A damper for use in a phonograph record reproduction system and adapted to be functionally coupled to the tone arm of said system and to ride on the surface of said record comprising:
   a housing;
   a slideable manner having a substantially airtight sliding fit within said housing wherein said slideable member is adapted to be functionally coupled to said tone arm;
   air passage means in said slideable member for permitting a preselected quantity of ambient air to flow through said slideable member and within said housing to serve as the damping medium by providing a preselected resistance to said systems; and
   fabric means affixed to said housing and adapted to ride on the surface of said record, said fabric means having a plurality of whisker like projections which extend below said record surface and engage the encoded grooves of said record whereby the effects of variations on the surface of said record on said tone arm are minimized.

2. The damper of claim 1 wherein said fabric means comprises a pile fabric.

3. The damper of claim 2 wherein said plurality of whisker like projections comprise loops of material woven into said pile fabric.

4. The damper of claim 2 wherein said plurality of whisker like projections comprise tufts of material woven into said pile fabric.

5. The damper of claim 1 further comprising a retainer coupled to said housing to limit the travel of said slideable member.

6. The damper of claim 1 further comprising mounting means for coupling said damper to said tone arm wherein said mounting means is adapted to adjustably couple said damper to said tone arm.

7. The damper of claim 6 further comprising a rod coupled to said slideable member, said rod having a threaded end adapted to be inserted into a corresponding threaded aperture in said mounting means.

8. A damper for use in a phonograph record and reproduction system and adapted to be functionally coupled to the tone arm of said system and to ride on the surface of said record comprising:
   mounting means for coupling said damper to said tone arm wherein said mounting means is adaptable to adjustably couple said damper to said tone arm;
   a housing;
   a slideable member within said housing having a substantially airtight sliding fit wherein said slideable member is adapted to be functionally coupled to said mounting means;
   air passage means in said slideable member for permitting a preselected quantity of ambient air to flow through said slideable member and within said housing to serve as the damping medium by providing a preselected resistance to said system; and
   fabric means affixed to said housing and adapted to ride on the surface of said record, said fabric means having a plurality of whisker like projections which extend below said record surface and engage the encoded grooves of said record whereby the effect of variations on the surface of said record on said tone arm are minimized.

9. The damper of claim 8 wherein said fabric means comprises a pile fabric.

10. A phonograph tone arm and cartridge damping system comprising:
    a tone arm having a cartridge at one end thereof; and
    damper means coupled to said tone arm and adapted to ride on the surface of a record to minimize the effect of surface variations on said tone arm and cartridge, said damper means including a housing, a piston means having a substantially airtight sliding fit within said housing and adapted to be functionally connected to said tone arm, air passage means in said piston means for permitting a preselected quantity of ambient air to flow through said piston means and within said housing to serve as the damping medium by providing a preselected resistance to said system, and fabric means affixed to said housing and adapted to ride on the surface of said record, said fabric means having a plurality of whisker like projections which extend below said record surface and engage the encoded grooves of said record whereby the effects of variations on the surface of said record on said tone arm are minimized.

11. The damping system of claim 10 wherein said fabric means comprises a pile fabric.

12. The damping system of claim 11 wherein said plurality of whisker like projections comprise loops of material woven into said pile fabric.

13. The damping system of claim 11 wherein said plurality of whisker like projections comprise tufts of material woven into said pile fabric.

14. The damping system of claim 10 further comprising mounting means for coupling said damper to said tone arm wherein said mounting means is adapted to adjustably couple said damper to said tone arm.

15. The damping system of claim 14 further comprising a rod coupled to said piston means, said rod having a threaded end adapted to be inserted into a corresponding threaded aperture in said mounting means.

16. The damping system of claim 15 wherein said fabric means comprises a pile fabric.

17. A damper for use in a phonograph record reproduction system, said damper being integrally connected to the tone arm of said system and adapted to ride on the surface of said record, comprising:
    a housing;
    a slideable member having a substantially airtight sliding fit within said housing, wherein said slideable member is functionally coupled to said tone arm;
    air passage means in said slideable member for permitting a preselected quantity of ambient air to flow through said slideable member and within said housing to serve as the damping medium by providing a preselected resistance to said system; and
    fabric means affixed to said housing and adapted to ride on the surface of said record, said fabric means having a plurality of whisker like projections which extend below said record surface and engage the encoded grooves of said record whereby the effects of variations on the surface of said record on said tone arm are minimized.

18. The damper of claim 17 wherein said fabric means comprises a pile fabric.

19. The damper of claim 18 wherein said plurality of whisker like projections comprise loops of material woven into said pile fabric.

20. The damper of claim 18 wherein said plurality of whisker like projections comprise tufts of material woven into said pile fabric.

21. The damper of claim 17 further comprising mounting means integral with said tone arm for coupling said damper to said tone arm wherein said mounting means is adapted to adjustably couple said damper to said tone arm.

22. The damper of claim 21 further comprising a rod coupled to said slideable member, said rod having a threaded end adapted to be inserted into a corresponding threaded aperture in said mounting means.

23. The damper of claim 22 wherein said first fabric means comprises a pile fabric.

* * * * *

UNITED STATES PATENT AND TRADEMARK OFFICE
CERTIFICATE OF CORRECTION

PATENT NO. : 4,151,998
DATED : May 1, 1979
INVENTOR(S) : Stephen Kurtin et al.

It is certified that error appears in the above-identified patent and that said Letters Patent are hereby corrected as shown below:

Claim 1, Column 9, line 14, "manner" should read -- member --.

Signed and Sealed this

Eighteenth Day of September 1979

[SEAL]

Attest:

LUTRELLE F. PARKER
Attesting Officer   Acting Commissioner of Patents and Trademarks